(12) United States Patent
Monpeurt et al.

(10) Patent No.: US 11,448,826 B2
(45) Date of Patent: Sep. 20, 2022

(54) WAVELENGTH DEMULTIPLEXING DEVICE IN PARTICULAR FOR OUT-OF-PLANE DEMULTIPLEXING

(71) Applicant: COMMISSARIAT A L'ENERGIE ATOMIQUE ET AUX ENERGIES ALTERNATIVES, Paris (FR)

(72) Inventors: Cyrielle Monpeurt, Grenoble (FR); Salim Boutami, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 17/305,347

(22) Filed: Jul. 6, 2021

(65) Prior Publication Data

US 2022/0011516 A1    Jan. 13, 2022

(30) Foreign Application Priority Data

Jul. 7, 2020  (FR) ...................................... 20 07180

(51) Int. Cl.
*G02B 6/293* (2006.01)
*H04N 5/33* (2006.01)

(52) U.S. Cl.
CPC ....... *G02B 6/2938* (2013.01); *G02B 6/29386* (2013.01); *H04N 5/33* (2013.01)

(58) Field of Classification Search
None
See application file for complete search history.

(56) References Cited

U.S. PATENT DOCUMENTS

| | | | |
|---|---|---|---|
| 5,299,045 A | 3/1994 | Sekiguchi | |
| 7,333,692 B1 | 2/2008 | Mossberg et al. | |
| 9,297,939 B2 | 3/2016 | Palanchoke et al. | |
| 9,547,137 B2 | 1/2017 | Favreau et al. | |
| 9,733,180 B2 | 8/2017 | Boutami et al. | |
| 9,784,623 B2 | 10/2017 | Palanchoke et al. | |
| 9,897,754 B2 * | 2/2018 | Zhou | G02B 6/122 |
| 10,295,742 B2 | 5/2019 | Hassan et al. | |
| 10,302,870 B2 * | 5/2019 | Hassan | G02B 6/136 |
| 10,337,986 B2 | 7/2019 | Lefebvre et al. | |
| 10,401,282 B2 | 9/2019 | Boutami et al. | |
| 10,459,163 B2 | 10/2019 | Menezo et al. | |
| 10,466,570 B2 * | 11/2019 | Hassan | G02F 1/2955 |
| 10,551,563 B2 | 2/2020 | Hassan et al. | |
| 10,578,437 B2 | 3/2020 | Taurel et al. | |
| 10,641,702 B2 | 5/2020 | Boutami et al. | |

(Continued)

OTHER PUBLICATIONS

U.S. Appl. No. 17/329,503, filed May 25, 2021, Monpeurt, C, et al.

(Continued)

*Primary Examiner* — Jerry Rahll
(74) *Attorney, Agent, or Firm* — Oblon, McClelland, Maier & Neustadt, L.L.P.

(57) ABSTRACT

A wavelength demultiplexing device configured so as to spatially distributing the spectral contributions of an incident light beam, when in use, and which includes a linear waveguide and a planar waveguide, formed in a coplanar way and adapted to be optically coupled with one another along a coupling line, by evanescent coupling. Such a device may further include diffraction gratings located in the planar waveguide, to extract light out of the latter.

14 Claims, 5 Drawing Sheets

(56) References Cited

U.S. PATENT DOCUMENTS

| | | | |
|---|---|---|---|
| 10,649,146 B2 | 5/2020 | Hassan et al. | |
| 10,677,988 B2 | 6/2020 | Boutami et al. | |
| 10,690,848 B2 | 6/2020 | Menezo et al. | |
| 10,788,623 B2 | 9/2020 | Boutami | |
| 10,937,643 B2 | 3/2021 | Boutami et al. | |
| 11,002,664 B2 | 5/2021 | Boutami et al. | |
| 2002/0076150 A1 | 6/2002 | Zhao et al. | |
| 2003/0016907 A1* | 1/2003 | LoCascio | B82Y 10/00 385/27 |
| 2006/0072875 A1* | 4/2006 | Bhagavatula | G02B 6/29332 385/30 |
| 2013/0259420 A1 | 10/2013 | Yoshida et al. | |
| 2015/0123017 A1* | 5/2015 | Yu | G02B 6/124 250/503.1 |
| 2018/0059329 A1* | 3/2018 | Boutami | G02B 6/1228 |
| 2022/0091018 A1* | 3/2022 | Boutami | G01N 15/1436 |

OTHER PUBLICATIONS

U.S. Appl. No. 14/617,042, filed Feb. 9, 2015, US2015/0226612 A1, Palanchoke, U, et al.
U.S. Appl. No. 15/867,215, filed Jan. 10, 2018, US2018/0204974 A1, Boutami, S, et al.
U.S. Appl. No. 16/030,887, filed Jul. 10, 2018, US20190018197 A1, Boutami, S, et al.
French Preliminary Search Report dated Mar. 18, 2021 in French Application 20 07180 filed on Jul. 7, 2020, (with English Translation of Categories of Cited Documents).

\* cited by examiner

WAVELENGTH DEMULTIPLEXING DEVICE IN PARTICULAR FOR OUT-OF-PLANE DEMULTIPLEXING

TECHNICAL FIELD

The invention relates to a wavelength demultiplexing device, for spatially separating the spectral contributions of an incident light beam.

PRIOR ART

Different examples of wavelength demultiplexers are known in the prior art. For example, mention may be made of arrayed waveguide grating, or AWG, demultiplexers, with a set of waveguides with different lengths adapted to create an incremental phase-shift and a planar waveguide within which light is recombined by constructive interferences. Mention may also be made of planar concave waveguide, or PCG, demultiplexers, with a planar waveguide bordered by a reflective diffraction grating. Finally, in a demultiplexer with a resonant ring grating, a main waveguide is coupled to secondary waveguides by respective series of resonant rings, to distribute the different wavelengths over the different secondary waveguides.

An objective of the present invention is to provide an alternative wavelength demultiplexing solution, adapted to perform a wavelength demultiplexing of a light beam in the infrared.

Another objective of the present invention is to provide a wavelength demultiplexing device adapted to be integrated into a lens-less imaging optical system to distribute on a scene to be illuminated light rays originating from an appended light source, when in use.

DISCLOSURE OF THE INVENTION

This objective is achieved with a wavelength demultiplexing device configured to spatially distribute the spectral contributions of an incident light beam when in use, and which includes:
  a linear waveguide, adapted to perform an optical guidance along a guide line and over a use wavelength range; and
  a planar waveguide, adapted to perform an optical guidance in a guide plane and over said use wavelength range;
  with the linear waveguide and the planar waveguide formed in a coplanar way, and configured so as to be optically coupled with one another by evanescent coupling along a coupling line, when in use.

In operation, light is injected into the device at one end of the linear waveguide. Light propagates in the linear waveguide, and progressively comes into the planar waveguide by evanescent coupling, at the coupling line. Not all wavelengths are transferred towards the planar waveguide in a homogeneous manner, along the coupling line. Some wavelength values are preferably transferred at the beginning of the coupling line, and other wavelength values are preferably transferred at the end of the coupling line, where the beginning and the end of the coupling line are defined with regards to the direction of propagation of light in the linear waveguide. Furthermore, upon arrival in the planar waveguide, the direction of propagation of light depends on the wavelength. Thus, a spatial separation of the wavelengths constitutive of a light beam sent at the input of the linear waveguide is achieved.

The demultiplexing device according to the invention, based on an evanescent coupling in a planar waveguide, could be easily adapted to wavelength demultiplexing of an infrared light beam.

By default, the different spectral contributions are distributed in the plane of the linear waveguide and of the planar waveguide. The demultiplexing device according to the invention may further comprise:
  an extraction assembly, located in the planar waveguide, and consisting of a plurality of diffraction grating each configured to extract light out of the planar waveguide;
with each of the diffraction gratings of the extraction assembly configured so as to extract light at a different wavelength called extraction wavelength.

This variant allows distributing the different spectral contributions out of the plane of the linear waveguide and of the planar waveguide. The device formed in this manner may be coupled to a set of optical fibers, each adapted to receive a signal at a respective wavelength. Alternatively, the device formed in this manner could be used to directly distribute on a scene to be illuminated light rays originating from an appended light source.

Preferably, all of the diffraction gratings of the extraction assembly are configured so as to extract light with the same extraction angle in absolute value, each at its respective extraction wavelength. In each diffraction grating, the extraction angle refers to an angle formed between the normal to the planar waveguide, and an axis according to which the extracted light at the extraction wavelength (called extraction axis) is directed.

The diffraction gratings consist of coupling gratings, known in the field of integrated optics for achieving an optical coupling between an optical fiber and a waveguide integrated on a photonic chip. A diffraction grating consists of patterns distributed in a regular or almost-regular manner. The value of the average step of distribution of the patterns defines the absolute value of the extraction angle at the extraction wavelength associated to said diffraction grating.

The extraction assembly is housed within the planar waveguide, without increasing the thickness of the latter. Furthermore, the planar waveguide and the linear waveguide are arranged in a coplanar way, preferably integrated within the same substrate. Hence, the device according to the invention could have a reduced thickness, smaller than or equal to 1.5 mm, and compatible with integration in a compact lens-less imaging system.

The manufacture of such a device does not require the implementation of complex processes, and features reduced constraints in particular in terms of alignment.

In operation, light is injected into the device at one end of the linear waveguide, and then transferred in the planar waveguide by evanescent coupling, along the entire length of the coupling line. This coupling achieves a first spatial spreading of the spectral contributions of light. This spreading is further increased by the propagation of light in the planar waveguide. The diffraction gratings of the extraction assembly are adapted to extract light, each at a different wavelength, called extraction wavelength. Furthermore, each is positioned in the planar waveguide so as to receive light at its extraction wavelength. Thus, the extraction assembly performs the extraction of light out of the plane of the planar waveguide. The different spectral contributions of the light beam at the input of the linear waveguide are extracted at different locations on the planar waveguide, each by one of the diffraction gratings of the extraction assembly. Thus, it is possible to recover light from a narrow and wide-spectrum light beam, and extract each of these spectral contributions out of the plane of the linear waveguide and of the planar waveguide, at a plurality of locations distributed over a wide surface. For example, the device according to the invention allows illuminating a surface belonging to a sample to be analysed, and having a width larger than or equal to 1 mm (the width referring to the largest distance separating two points on the considered surface). The distribution of light on said surface is relatively homogeneous, in terms of luminous intensity, since a plurality of gratings is involved in light extraction. Thus, it is possible to perform a chromatic distribution of light, over a large surface, in a homogeneous manner in terms of luminous intensity (but not in terms of wavelength), and using a thin and easy to manufacture device.

Preferably, a distance between the linear waveguide and the planar waveguide varies decreasingly, along the coupling line and in the direction of propagation of light in the linear waveguide, when in use.

Advantageously, the planar waveguide comprises a core layer an edge of which opposite the coupling line is bent upon itself so as to form an indentation, and the linear waveguide is bent upon itself, and located inside the indentation formed in the planar waveguide. In particular, the edge of the core layer opposite the coupling line may form a circle-arc portion over an angular sector comprised between 240° and 330°. The opposite edge of the core layer may also be bent upon itself. Each of the edge of the core layer opposite the coupling layer and its opposite edge may form a circle-arc portion, said circle-arcs being preferably concentric. The core layer then forms a ring portion, for example over an angular sector comprised between 240° and 330°.

The diffraction gratings of the extraction assembly may be positioned so that, in an orthogonal projection of the diffraction gratings on the coupling line, these are arranged in the descending order of their extraction wavelength, along the coupling line and in the direction of propagation of light in the linear waveguide when in use.

In an orthogonal projection of the diffraction gratings on the coupling line, these are advantageously arranged in the ascending order of their extraction rate, along the coupling line and in the direction of propagation of light in the linear waveguide when in use.

Preferably, in each of the diffraction gratings of the extraction assembly, the patterns of the diffraction grating are disposed along lines which are orthogonal to a direction of propagation of light in the planar waveguide at said diffraction grating.

Advantageously, the planar waveguide includes a core layer interposed between two optical cladding layers, and the diffraction gratings extend in one of the optical cladding layers, or in a superficial region of the core layer at an interface between the core layer and one amongst the two optical cladding layers.

According to an advantageous embodiment:
  the planar waveguide comprises a core layer an edge of which opposite the coupling line is bent upon itself so as to form an indentation,
  the linear waveguide is bent upon itself, and located inside the indentation formed in the planar waveguide; and
  the device further includes a support substrate, transparent over the use wavelength range, superimposed with the planar waveguide along an axis orthogonal to the plane of the planar waveguide, with the support substrate which is provided with a through opening located opposite a portion of at least one indentation formed in the planar waveguide.

The through opening may be delimited by at least one transverse face, which extends from one face to the opposite face of the support substrate, and said transverse face includes a curved surface or a series of facets inclined obliquely with respect to the plane of the planar waveguide.

Each of the diffraction gratings may be configured so as to extract light at its extraction wavelength, according to a respective extraction axis directed obliquely with respect to the plane of the planar waveguide, with the extraction axis directed so that light reaches said transverse face at a normal incidence.

The device according to the invention may further include a pedestal, transparent over the use wavelength range, and located opposite the through opening formed in the support substrate.

The invention also covers an infrared imaging system which includes:
  a wavelength demultiplexing device according to the advantageous embodiment mentioned hereinabove, configured so as to distribute on a scene to be illuminated light rays originating from an appended light source, when in use; and
  an imaging module, including an array infrared detector configured so as to receive light rays sent back by the scene to be illuminated;
with the array infrared detector located opposite at least one portion of the indentation formed in the planar waveguide, on the side of the planar waveguide opposite to the support substrate.

The system may further include an infrared light source forming the appended light source, and the wavelength demultiplexing device is configured so as to receive input light rays originating from said infrared light source and distribute these rays on the scene to be illuminated, when in use.

The system according to the invention may include a spacing element, mounted secured to the imaging module, and provided with a bearing surface intended to come into contact with a sample to be analysed and located on one side of the spacing element opposite to the imaging module, and the wavelength demultiplexing device forms all or part of the spacing element.

BRIEF DESCRIPTION OF THE DRAWINGS

The invention will be better understood upon reading the description of embodiments provided for merely indicative and non-limiting purposes, with reference to the appended drawings wherein.

DETAILED DISCLOSURE OF PARTICULAR EMBODIMENTS

To facilitate reading, the axes of an orthonormal reference frame (Oxyz) are represented in the figures.

Throughout the entire text, the term "infrared" relates to a portion of the light spectrum belonging to a spectral band ranging from 0.78 µm to 50 µm, more preferably from 2 µm to 14 µm.

A waveguide consists of a core, within which light circulates, and an optical cladding, ensuring a desired optical index difference between the core and a medium surrounding the core. The core consists of a material that is optically-transparent at the wavelengths to propagate, for example with a transmission ratio higher than or equal to −3 dB/cm at said wavelengths. Advantageously, it has the same optical index and the same chemical composition over the entire volume thereof. The waveguide is adapted to guide the propagation of light, by successive reflections at the interfaces between the core and the optical cladding (here, more particularly, it consists of a refractive guidance). In a planar waveguide, a core layer is interposed between two optical cladding layers, and light is guided in the core layer by successive reflections at the interfaces (planar and parallel to one another) between the core layer and each respective optical cladding layer. Thus, light is confined according to one of the axes of the three-dimensional space, and free to propagate according to the two other axes of the three-dimensional space. In practice, the core layer consists of an optical part having a reduced dimension according to one of the axes of the three-dimensional space (here the axis (Oz) of the thickness), and large dimensions according to each of the two other axes of the three-dimensional space (here the axes (Ox) and (Oy) of the length and the width). In the core layer, the ratio between the thickness and the length, respectively the thickness and the width, is preferably greater than or equal to 5, and possibly greater than or equal to 10. According to the same principle, in a linear waveguide, a core extends along a line while being surround by an optical cladding, and light is free to propagate along said line and confined in the other directions.

Figure 10:
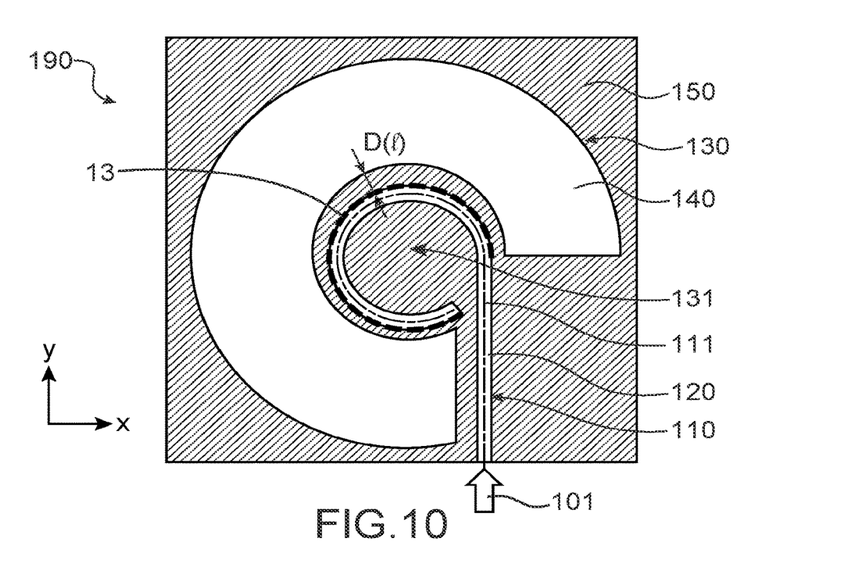
FIG. 10 schematically illustrates, according to a top view in transparency, a wavelength demultiplexing device according to a first embodiment of the invention.

To start, a first embodiment of a wavelength demultiplexing device 190 according to the invention is described. This device is illustrated in FIG. 10, according to a top view in transparency. The device 190 includes a linear waveguide 110 and a planar waveguide 130.

The linear waveguide 110 is adapted to perform an optical guidance along a guide line 111 and over a use wavelength range. The guide line 111 extends in a plane parallel to the plane (xOy). The use wavelength range is located in the infrared, and has a spectral width larger than or equal to 3 µm, for example a spectral width ranging from 5.9 µm to 9.7 µm.

The linear waveguide 110 comprises a core 120, embedded in a low-index layer 150. The optical index of the core 120 is strictly higher than the optical index of the low-index layer 150. Here, the optical cladding of the linear waveguide 110 is formed by a region of the low-index layer 150 surrounding the core 120. Here, the core 120 consists of germanium, or a germanium and silicon alloy (SiGe). Here, the low-index layer 150 consists of a germanium and silicon alloy, with a higher silicon content than in the core 120. For example, the core 120 is made of germanium and the low-index layer 150 is made of a germanium-silicon alloy with 40% of germanium atoms. In any case, each of the core 120 and the low-index layer 150 is optically transparent over the use wavelength range, for example with a transmission ratio higher than or equal to −3 dB/cm at said wavelengths.

The core 120 of the linear waveguide 110 extends along the guide line 111 located in a plane (xOy). Preferably, the section of the core 120 in a plane orthogonal to the guide line 111 is square shaped, for example a square with a 1.8 µm side. In operation, light in the linear waveguide is guided along this guide line 111, by successive reflections at the interfaces between the core 120 and the low-index layer 150. The guide line 111 may comprise a curved portion and/or a straight portion. Here, it consists of a straight portion followed by a circle-arc portion. Preferably, the circle-arc portion is a circle arc with an angle comprised between 220° and 260°, here a 240° angle. For example, the radius of curvature of the circle-arc portion is comprised between 500 µm and 1 mm, for example 707 µm (at the centre of the guide).

Preferably, the thickness of the linear waveguide is comprised between 1.5 µm and 2.0 µm (dimensions according to the axis (Oz)), for example a 1.8 µm thickness. Preferably, the linear waveguide 110 is monomodal according to the axis (Oz), and over the entire use wavelength range. At a wavelength of 5.9 µm (and therefore a fortiori at the longer wavelengths), the linear waveguide 110 is monomodal for a thickness larger than or equal to 1.8 µm.

The planar waveguide 130 is adapted to perform an optical guidance in a guide plane and over said use wavelength range. Here, the guide plane, also called plane of the planar waveguide, extends parallel to the plane (xOy). The planar waveguide 130 comprises a core layer 140, embedded in the same low-index layer 150. The optical index of the core layer 140 is strictly higher than the optical index of the low-index layer 150. Here, the optical cladding of the planar waveguide 130 is formed by the regions of the low-index layer 150 surrounding the core layer 120. In particular, the optical cladding of the planar waveguide 130 includes two optical cladding layers, located on either side of the core layer 140 along the axis (Oz). Preferably, the core layer 140 consists of the same material as the core 120 of the linear waveguide 110. In operation, light in the planar waveguide 130 is guided in a guide plane, by successive reflections at the interfaces between the core layer 140 and the optical cladding layers formed by the material of the low-index layer 150. Preferably, the planar waveguide 130 is monomodal according to the axis (Oz), and over the entire use wavelength range.

The linear waveguide 110 and the planar waveguide 130 are coplanar. In particular, the core 120 of the linear waveguide 110 and the core layer 140 of the planar waveguide 130 have their respective lower faces coplanar and their respective upper faces coplanar, and all of them parallel to the plane (xOy). Hence, the guide line 111 extends in the guide plane of the planar waveguide 130. For example, the core layer 140 of the planar waveguide 130 and the core 120 of the linear waveguide 110 are formed in a germanium layer with a 1.8 µm thickness, embedded in a SiGe (with 40% of Ge) layer. Here, we have a 4 μm thickness of SiGe, on either side of the germanium layer along the axis (Oz).

Here, the planar waveguide 130 and its core layer 140 include an indentation 131, or setback. In particular, the core layer 140 of the planar waveguide 130 has, here, a straight prism shape, with the bases of the prism being parallel to the plane (xOy). For example, a width of the bases of the prism is comprised between 2 mm and 5 mm. Here, each of the bases of the prism has its external contour delimited by a disk, called outer disk. In each of the bases of the prism, the indentation 131 corresponds to an opening in the outer disk, or setback, which extends, here, from one edge up to the centre of the outer disk. In each of the bases of the prism, the opening in the outer disk consists, here, of the combination of an angular sector and of an inner disk, with the inner disk arranged substantially concentrically with the outer disk, and with the angular sector having an angle comprised between 120° and 30° (90°, in the example of FIG. 10). Advantageously, a ratio between a diameter of the outer disk and a diameter of the inner disk is greater than or equal to two.

Here, the linear waveguide 110 extends inside the indentation 131, without any direct physical contact between the core 120 of the linear waveguide 110 and the core layer 140 of the planar waveguide 130. The material of the low-index layer 150 extends inside the indentation 131, in particular between the core 120 of the linear waveguide 110 and the core layer 140 of the planar waveguide 130.

The linear waveguide 110 and the planar waveguide 130 are adapted to be optically coupled with one another, over the use wavelength range, by evanescent coupling, and along the entire length of a coupling line 13 (in dotted line). In other words, over the entire length of a line called coupling line 13, the linear waveguide 110 and the planar waveguide 130 are arranged close enough to one another so that an evanescent wave generated by a light beam in one of the guides penetrates into the other guide. The coupling line 13 extends along an edge of the core 120 of the linear waveguide 110, at the circle-arc portion of the later, and opposite an edge of a core layer 140 of the planar waveguide 130. Here, the coupling line 13 extends in the indentation 131.

In operation, a wide-spectrum light beam is injected at the input of the linear waveguide 110, at the straight portion of the latter (arrow 101). The wavelength spectrum of the beam 101 extends at least over the entire use wavelength range, and with a spectral width larger than or equal to 3 μm. Light is guided in the linear waveguide 110, up to the coupling line 13. At the coupling line 13, light is progressively transferred from the linear waveguide 110 towards the planar waveguide 130, by evanescent coupling.

Not all of the different wavelengths are transferred in a homogeneous manner towards the planar waveguide 130, along the coupling line. Advantageously, a distance D(I) between the core 120 of the linear waveguide 110 and the core layer 140 of the planar waveguide 130 varies according to the considered position I along the coupling line. The variation of the distance D(I) according to I is adapted so that a wavelength value λH is transferred in a homogeneous manner towards the planar waveguide 130, over the entire length of the coupling line 13. The wavelength λH belongs to the use wavelength range. The other wavelengths of the use wavelength range are transferred in a non-homogeneous manner towards the planar waveguide 130. Preferably, they are transferred with a transmission rate that increases, respectively decreases, along the coupling line 13 and in the direction of propagation of light in the linear waveguide 110, depending on whether the considered wavelength is shorter, respectively longer, than λH. The distance D(I) is measured, at any point, along an axis orthogonal to the tangent to the coupling line 13 at the considered point. Advantageously, the distance D(I) decreases along the coupling line 13 and in the direction of propagation of light in the linear waveguide 110, when in use. Preferably, λH is a median wavelength of the use wavelength range. For example, the use wavelength range extends from 5.9 μm to 9.7 μm, and λH is 7.8 μm. The wavelengths comprised between 7.8 μm and 9.7 μm are then transferred towards the planar waveguide 130 mainly at an upstream area of the coupling line 13, on the input side of the linear waveguide 110, whereas the wavelengths comprised between 5.9 μm and 7.8 μm are transferred mainly at a downstream area of the coupling line 13, on the side opposite to the input of the linear waveguide 110. To obtain this variation of the distance D(I), the aforementioned inner disk, defining the shape of the indentation 131 in the planar waveguide 130, is not arranged exactly concentrically with the circle-arc portion of the planar waveguide 110. Complementarily or alternatively, the variation of the distance D(I) is obtained using an edge of the core layer 140, at the coupling line 13 (here in the indentation 131), which does not exactly follow a circle-arc shape. Complementarily or alternatively, the variation of the distance D(I) is obtained using a linear waveguide 110 a curved portion of which does not exactly follows a circle-arc shape.

Thus, to each wavelength corresponds a determined position along the coupling line 13, where the energy transfer rate is maximum (except for λH which is transferred in a homogeneous manner over the entire coupling line). Furthermore, starting at each position along the coupling line 13, light propagates in the planar waveguide 130 in a direction that depends on the wavelength. In particular, a transfer angle θ(λ) depends on the wavelength λ, with θ(λ) an angle formed, at each point of the coupling line 13, between the tangent to the core 120 of the linear waveguide 110 and a light ray transferred from the linear waveguide 110 to the planar waveguide 130. Assuming that the transfer angle θ(λ) does not vary with the distance D(I) (a realistic assumption), this optimum location is defined using the equation (1) giving the value of the angle θ as a function of λ:

$$\theta(\lambda) = \arcsin\left(\sqrt{\frac{\tilde{n}_{eff}^2(\lambda) - n_{eff}^2(\lambda)}{\tilde{n}_{eff}^2(\lambda)}}\right) \quad (1)$$

with $n_{eff}$ the effective index of the guided mode in the linear waveguide 110 and $\tilde{n}_{eff}$ the effective index of the guided mode in the planar waveguide 130.

Thus, the device of FIG. 10 performs a wavelength demultiplexing, since it spatially separates the spectral contributions of an incident light beam injected at the input of the linear waveguide 110, preferably a light beam in the infrared. The wavelengths are distributed in the plane (xOy) of the planar waveguide 130.

Figure 1A:
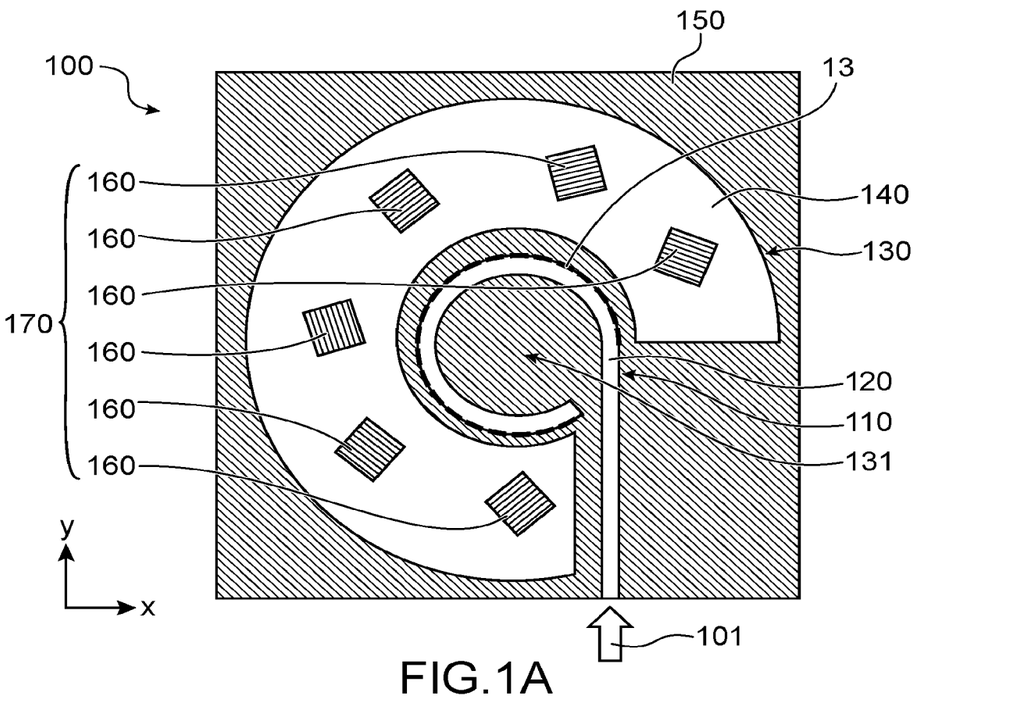
FIGS. 1A and 1B schematically illustrate a wavelength demultiplexing device according to a second embodiment of the invention, respectively according to a top view in transparency and according to a sectional view.
Figure 1B:
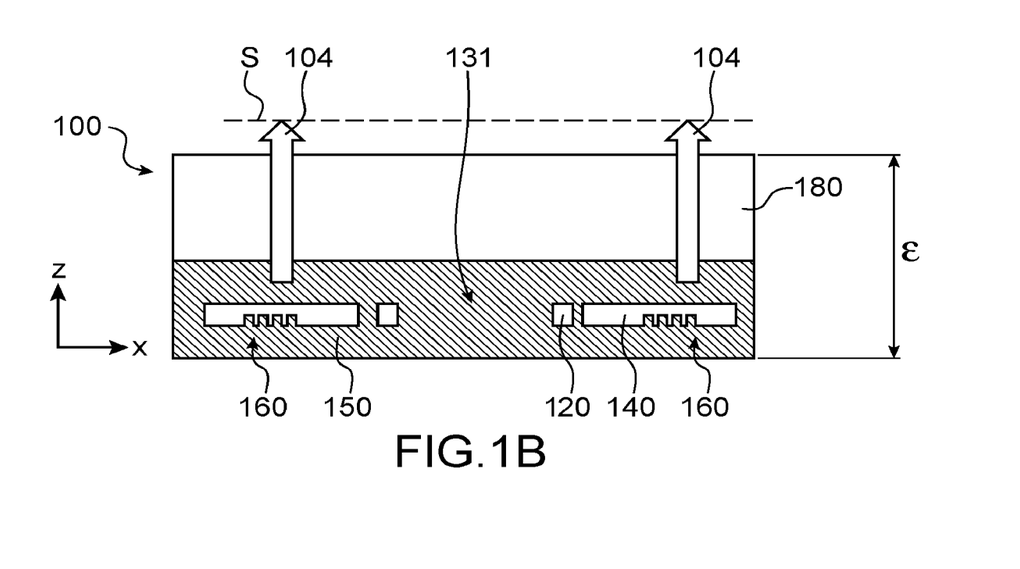

Afterwards, a second embodiment of a demultiplexing device 100 according to the invention, for distributing the wavelengths out of the plane of the planar waveguide, is described. This device 100 is illustrated in FIGS. 1A and 1B, respectively according to a top view in transparency and according to a sectional view in a plane (xOz) passing through the centre of the device 100. This second embodiment differs from the device of FIG. 10 only in that it further includes an extraction assembly 170, consisting of a plurality of diffraction gratings 160. A diffraction grating refers to a series of patterns, distributed in a periodic or almost-periodic manner (variation of the step smaller than or equal to 10% between two successive patterns). In the invention, each diffraction grating 160 is adapted to divert, out of the plane of the planar waveguide 130, light circulating in the latter.

The diffraction gratings 160 extend in the planar waveguide 130, here inside a superficial region of the core layer 140. Advantageously, a ratio between the thickness of the core layer 140 of the planar waveguide 130 and the depth of the diffraction gratings 160 is then greater than or equal to two. Here, the diffraction gratings 160 consist of patterns each including a portion consisting of the material of the core layer 140 and a portion consisting of the material of the low-index layer 150. For example, the diffraction gratings 160 are formed by an array of pads made of the material of the core layer 140 embedded in the material of the low-index layer 150. Preferably, but without limitation, each diffraction grating 160 is a one-dimensional grating, consisting of patterns which extend according to straight lines parallel to one another or even according to curved lines. Preferably, the patterns do not vary along the axis (Oz).

The diffraction gratings 160 are configured so as to extract light out of the planar waveguide 130, each at a different wavelength called extraction wavelength. For this purpose, each diffraction grating has adapted position on the planar waveguide and average step of distribution of the patterns. In particular, it is possible to assign a respective extraction wavelength to each diffraction grating 160. Using the equation (1) relating a transfer angle θ(A) and a wavelength λ, it is possible to then define, for each diffraction grating 160, an optimum location on the planar waveguide 130, enabling said grating 160 to receive the largest amount of light as possible at its extraction wavelength. Preferably, the diffraction gratings 160 have different values of their extraction wavelength, and therefore different values of their average step of distribution of the patterns.

In an orthogonal projection on the coupling line 13, the diffraction gratings 160 are distributed one after another along the coupling line 13. To each wavelength $\Delta_i$ corresponds a determined position $I_i$ along the coupling line, where the energy transfer rate is maximum. Advantageously, the diffraction grating 160, whose orthogonal projection on the coupling line is located at the position $I_i$, therefore has the extraction wavelength $\lambda_i$. In an orthogonal projection on the coupling line 13, the diffraction gratings 160 are advantageously arranged in the descending order of their extraction wavelength, along the coupling line and in the direction of propagation of light in the linear waveguide 110, when in use. The value of the extraction wavelength and the position of the orthogonal projection of the diffraction grating 160 on the coupling line 13 may be related by a linear function. Here, all of the diffraction gratings 160 further extend at the same distance from the coupling line 13. Advantageously, the diffraction gratings 160 are positioned close to one another, and may even be in direct physical contact in pairs.

Here, the device 100 further includes a support substrate 180. The support substrate 180 extends opposite the low-index layer 150, in a plane (xOy). Here, the support substrate 180 is affixed against the low-index layer 150, in direct physical contact with the latter. Here, the support substrate 180 extends on the side of the planar waveguide 130 opposite to that one receiving the diffraction gratings 160. The support substrate 180 is transparent over the use wavelength range. Preferably, it has an optical index lower than that of the low-index layer 150. Preferably, it consists of silicon. In particular, it allows ensuring a good mechanical strength of the planar waveguide 130 and of the linear waveguide 110. With this support substrate 180, the thickness ε (according to the axis (Oz)) of the device 100 is preferably comprised between 100 μm and 1.5 mm, preferably between 100 μm and 1.0 mm, for example equal to 725 μm. Preferably, the thickness of the support substrate is larger than or equal to 200 μm.

In operation, as in the first embodiment, a wide-spectrum light beam is injected at the input of the linear waveguide 110 and transferred in the planar waveguide 130. Afterwards, light propagates in the planar waveguide 130, by successive reflections at the interfaces between the core layer 140 and the low-index layer 150, and is then extracted out of the planar waveguide 130 at each of the diffraction gratings 160 (arrows 104, FIG. 1B). Each diffraction grating 160 extracts a distinct spectral contribution of the wide-spectrum light beam injected at the input. The different spectral contributions are extracted out of the plane of the planar waveguide 130. Each of the diffraction gratings 160 extracts light in two opposite directions. It is possible to favour one of the extraction directions, for example the extraction in the direction of the support substrate 180, towards a surface S. For this purpose, it is possible to block the rays emitted in the direction opposite to the surface S, for example using an absorption layer affixed against the low-index layer 150, on the side opposite to the support substrate 180.

Advantageously, each diffraction grating 160 is optically coupled to a respective optical fiber, which is not represented, so as to receive light at the extraction wavelength of said grating. Alternatively, the extracted light may be used to illuminate the scene to be illuminated, preferably located opposite the support substrate 180.

Figure 2:
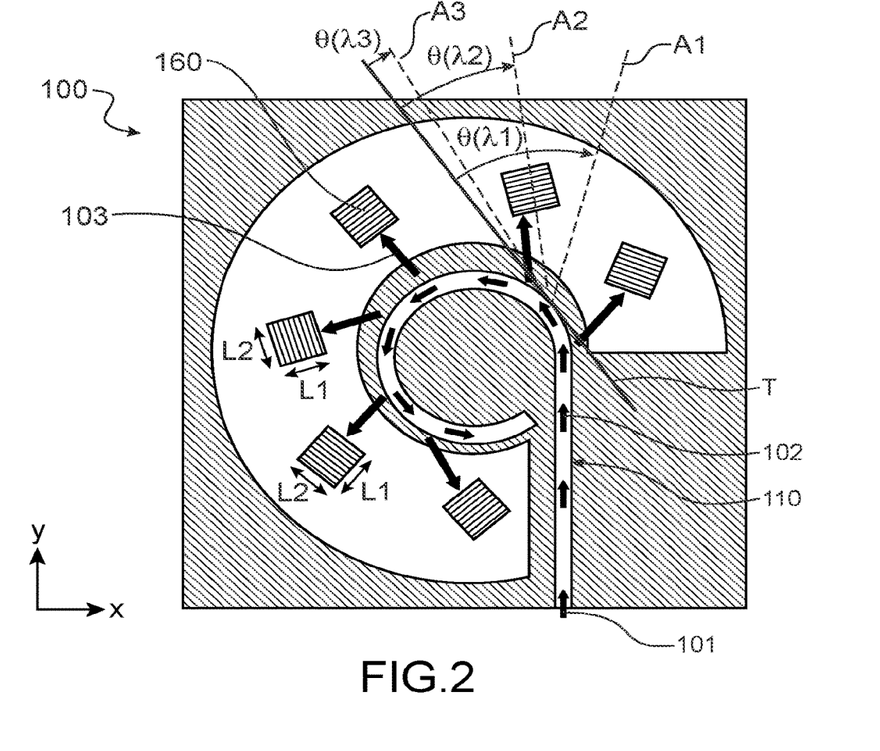
FIG. 2 schematically illustrates the operation of the device of FIG. 1A.

FIG. 2 schematically illustrates the device 100, when in use. The arrow 101 represents the light beam injected at the input of the linear waveguide 110. The arrows 102 represent the light propagating in the linear waveguide 110. The arrows 103 represent the light transferred from the linear waveguide 110 towards the planar waveguide 130, by evanescent coupling. Light coming from the linear waveguide 110 propagates in the planar waveguide in a direction that depends on the wavelength (cf. axes A1, A2, A3 associated respectively to wavelengths λ1, λ2, λ3 and respectively inclined by an angle θ(λ1), θ(λ2) and θ(λ3) with respect to a tangent to the coupling line). Each diffraction grating 160 of the extraction assembly is positioned, on the planar waveguide, so as to intercept as much light as possible at its extraction wavelength.

This second embodiment allows performing an out-of-plane wavelength multiplexing and/or demultiplexing, using a device that has low losses, as well as a good flux resistance. The wavelength multiplexing and/or demultiplexing device also features a great compactness, and in particular a reduced thickness.

Each diffraction grating 160 may have a constant value of the step of distribution of the patterns. Alternatively, at least one of the gratings may have a variable value of the distribution step of the patterns. In any case, it is possible to define an average step of distribution of the patterns, equal to the arithmetic average of the values assumed by the step, or equal to the step itself when the latter is constant.

To avoid light extracted by a diffraction grating 160 being reflected at an interface between the support substrate 180 and the surrounding environment, an angle between the normal to said interface and a light ray extracted by said grating must remain smaller than a critical threshold. Preferably, this angle assumes the zero value. Each of the diffraction gratings 160 is then configured to extract its respective extraction wavelength from the light, and in a direction orthogonal to the interface between the support substrate 180 and the surrounding environment, at the location of the support substrate from which the extracted light comes out. Hence, each of the diffraction gratings 160 is configured to extract light at its respective extraction wavelength, in the form of a light beam directed according to the axis (Oz). In each diffraction grating 160, an extraction angle at the extraction wavelength is defined by the value of the average step of distribution of the patterns. In other words, each diffraction grating 160 is associated to a predetermined extraction wavelength, and has a value of the average step adapted so as to have a desired value of the extraction angle at said extraction wavelength. The adequate value of the average step may be determined in a known manner using the grating formula and considering the refraction orders 1 and −1.

Preferably, each diffraction grating 160 has a large length L1, defined according to an axis parallel to a direction of propagation of light in the planar waveguide 130, at the extraction wavelength of said grating and at the location of said grating. Furthermore, each diffraction grating 160 has a large width L2, defined according to an axis orthogonal to the axis of the length L1, in a plane (xOy). Here, the length L1 is larger than or equal to 1 mm, and the width L2 larger than or equal to 200 μm. Thus, a divergence of the light rays extracted by the grating 160, at the extraction wavelength, could be considered to be negligible.

Figure 3A:
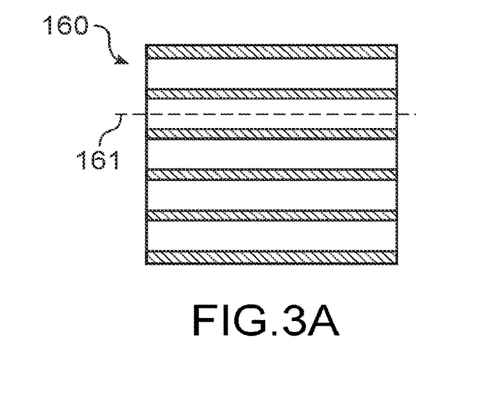
FIGS. 3A and 3B schematically illustrate two examples of a diffraction grating in the device of FIG. 1A.
Figure 3B:
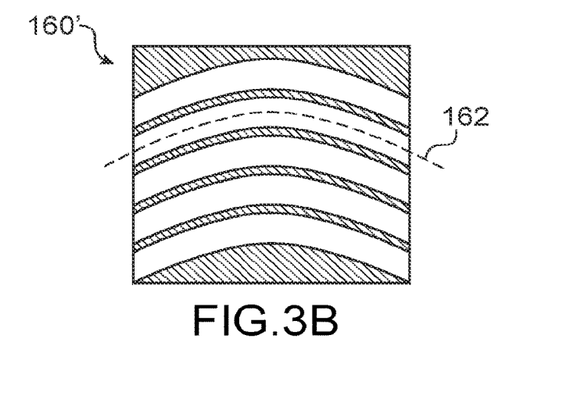

Preferably, each of the diffraction gratings 160 is a one-dimensional grating, consisting of elongate-shaped patterns (for example between 50 and 150 patterns). Preferably, the different patterns are parallel to one another. In the device 100, these patterns are orthogonal to a direction of propagation of light in the planar waveguide 130, at the extraction wavelength and at the location of said grating. FIGS. 3A and 3B illustrate two examples of distribution of patterns in an extraction grating of the device according to the invention.

In FIG. 3A, the patterns of the diffraction grating 160 extend along straight lines 161 parallel to one another, each extending from one edge to the opposite edge of the grating. In the device 100, the diffraction grating 160 is directed so that the straight lines 161 are orthogonal to a median direction of propagation of light in the planar waveguide 130, at the extraction wavelength and at the location of said grating.

FIG. 3B illustrates a diffraction grating 160' according to a variant of the invention, wherein the patterns of the grating are distributed along convex curved lines 162 each extending from one edge to the opposite edge of said grating. The convex curved lines 162 are cambered in a direction opposite to the coupling line 13. The shape of the lines 162 is adapted so that, when light propagates in the planar waveguide, the diffraction grating 160' could be directed so that the curved lines 162 are orthogonal at every point to the light rays propagating in the planar waveguide 130 at the extraction wavelength and at the location of said grating.

Figure 4A:
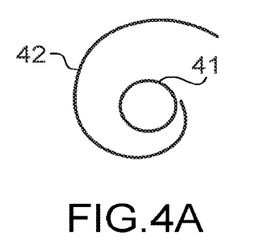
FIGS. 4A, 4B, 4C, 4D, 4E and 4F schematically illustrate different distribution models of the diffraction gratings in a device according to the invention.
Figure 4B:
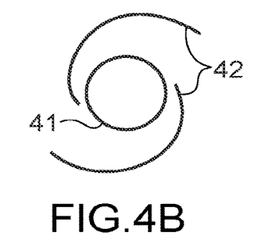
Figure 4C:
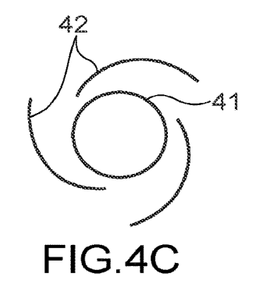
Figure 4D:
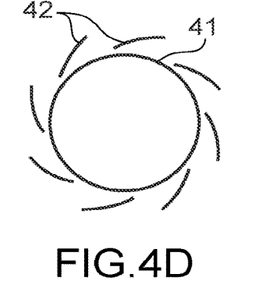
Figure 4E:
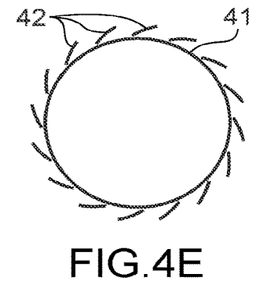
Figure 4F:
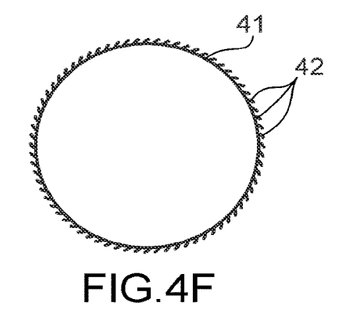

FIGS. 4A to 4F illustrate different models of distribution of the diffraction gratings and of their patterns in the planar waveguide. In each of the figures, a disk 41 with the same centre and the same diameter as the circle-arc portion of the linear waveguide is represented. The curved segments 42 around the disk define lines along which patterns of the different diffraction gratings extend. The model of FIG. 4F is preferred, because it allows for a great compactness and a large volume inside the circle-arc portion of the linear waveguide.

In operation, light is transferred from the linear waveguide 110 towards the planar waveguide 130, as it propagates along the coupling line. To each wavelength corresponds a point where the energy transfer rate is maximum. The transferred energy amount, at this point, depends on the energy transfer rate and on the energy amount remaining in the linear waveguide at said wavelength and at this point. Hence, the wavelengths transferred at first are transferred with a larger amount of energy than those transferred at last. According to an advantageous embodiment, the extraction rate varies from one diffraction grating 160 to another, to compensate for this effect and improve the homogeneity of the extraction of light at the different wavelengths. Advantageously, this extraction rate varies in a monotonically increasing manner, along the coupling line 13 and in the direction of propagation of light in the linear waveguide, when in use. The variation may include plateaus, or be strictly increasing.

The extraction rate of a diffraction grating depends on an average value of its fill factor, here a ratio between the total volume occupied by the material with the lowest index and the total volume of the diffraction grating. Extraction is even higher as the fill factor is close to 50% (modulation with the highest index). Preferably, the average value of the fill factor does not exceed 0.5 (50%) in any of the diffraction gratings 160 of the extraction assembly. In this case, the higher the fill factor, the higher will be the extraction rate, and vice versa. In an orthogonal projection on the coupling line 13, the diffraction gratings 160 are then advantageously arranged in the ascending order of their fill factor, along the coupling line and in the direction of propagation of light in the linear waveguide 110, when in use. Advantageously, all diffraction gratings 160 have the same depth (dimension according to the axis (Oz)), for example comprised between 0.20 and 1 μm (preferably half the thickness of the core layer 140). Hence, the fill factor defined hereinabove is reduced to a surface ratio. Complementarily or alternatively, the variation of the extraction rates may be obtained using extraction gratings 160 whose depth varies from one grating to another and/or using extraction gratings 160 whose length L1 varies from one grating to another.

In each of the embodiments and variants of the invention, the fill factor may be variable within the same diffraction grating 160, to symmetrise the far-field radiation.

Figure 5:
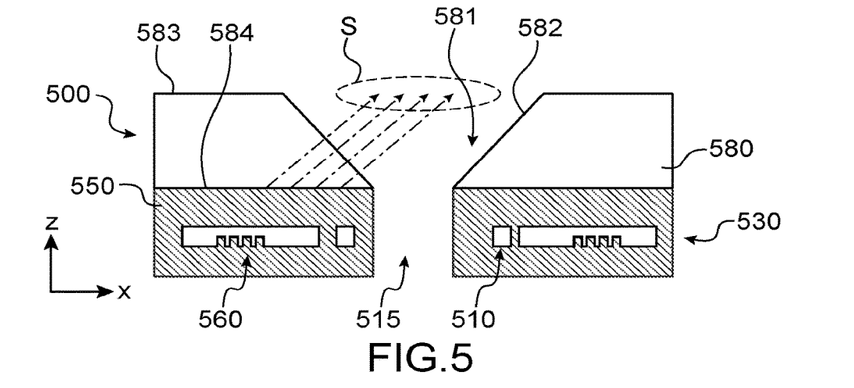
FIG. 5 schematically illustrates, according to a sectional view, a device according to a third embodiment of the invention.

FIG. 5 schematically illustrates, according to a sectional view, a device 500 according to a third embodiment of the invention, which may serve as a wavelength multiplexer and/or demultiplexer, as well as to achieve an oblique lighting of a scene to be illuminated S.

In the device 500 of FIG. 5, the support substrate 580 includes a through opening 581, which extends opposite a volume surrounded by the circle-arc portion of the linear waveguide 510.

Here, the scene to be illuminated S extends opposite the through opening 581, on the support substrate 580 side. Advantageously, the scene to be illuminated S extends in the same plane (xOy) as the upper face 583 of the support substrate 580, on the side opposite to the linear 510 and planar 530 waveguides. The dimensions of the scene to be illuminated S are substantially equal to the dimensions of the through opening 581, and therefore substantially equal to the dimensions of the volume surrounded by the circle-arc portion of the linear waveguide 510. The scene to be illuminated S is not aligned with the extraction gratings.

Thus, the drawbacks related to light extraction towards two opposite directions are avoided.

The through opening 581 is delimited by at least one transverse face 582, which extends from one face 583 to an opposite face 584 of the support substrate 580 (with the faces 583 and 584 parallel to the plane (xOy)). The at least one transverse face 582 may consist of a multitude of planar facets each extending obliquely with respect to the plane (xOy), for example each inclined by an angle equal to 54.74° or 45° with respect to the plane (xOy). Alternatively, the at least one transverse face 582 may consist of a surface of revolution which features an axial symmetry around an axis parallel to the axis (Oz). Here, a generatrix of this surface is a straight line.

Each diffraction grating 560 is configured so as to extract light according to a respective light beam, coming out of the device 500 at the transverse face 582 formed by the through opening 581. Hence, each diffraction grating 560 is configured so as to extract light at its extraction wavelength, according to a light beam directed obliquely with respect to the plane (xOy). Preferably, the extracted light reaches the transverse face 582 at a normal incidence. As detailed hereinbefore, this property is obtained by a value adapted to the average step of distribution of the patterns in the grating. Hence, all diffraction gratings 560 of the extraction assembly have the same value of the extraction angle, in absolute value and at their respective extraction wavelength.

The normal incidence criterion on the transverse face 582 sets a half-width of the scene to be illuminated S. With the transverse face 582 inclined by an angle equal to 54.74° with respect to the plane (xOy), it is possible to obtain a half-width comprised between 300 μm and 5 mm, for example 512 μm.

Advantageously, yet optionally, the low-index layer 550 receiving the linear 510 and planar 530 waveguides is provided with a through opening 515, aligned with the through opening 581 in the support substrate 580, and surrounded by the circle-arc portion of the linear waveguide 510. Thus, optical losses on a back light signal are limited (cf. hereinafter). Preferably, the through opening 515 has a constant section along the axis (Oz), equal to the smallest section of the through opening 581 along the same axis.

In a non-represented variant, the through opening in the support substrate is delimited by a transverse face which features a symmetry of revolution around an axis parallel to the axis (Oz), and whose generatrix includes a curved portion, incurved inwards of the support substrate. Thus, the through opening in the support substrate forms a surface of revolution acting as a concave lens.

Figure 6A:
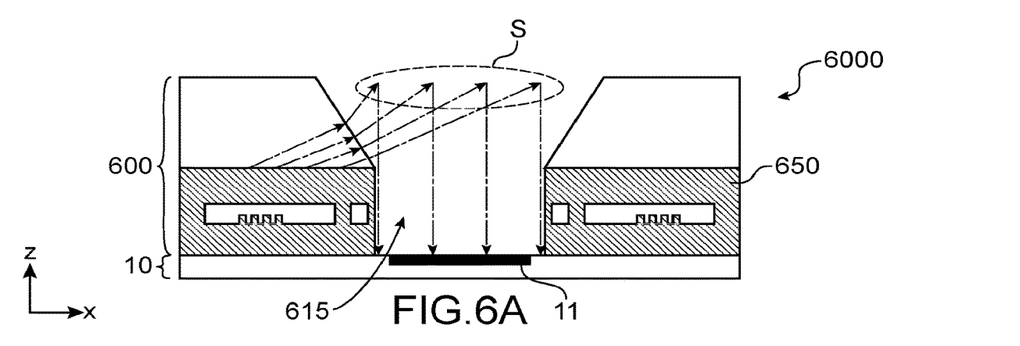
FIGS. 6A and 6B schematically illustrate an infrared imaging system according to a first embodiment of the invention, respectively according to a sectional view and according to a top view in transparency.
Figure 6B:
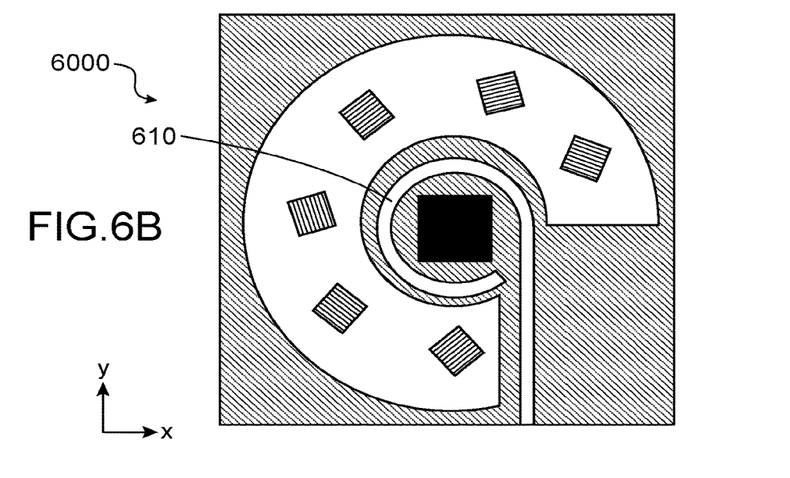

FIGS. 6A and 6B schematically illustrate an infrared imaging system 6000 according to a first embodiment of the invention, respectively according to a sectional view in a plane (xOz) passing through the centre of the system 6000 and according to a top view in transparency.

Here, the system 6000 includes a device 600 according to the invention, and a detection module 10. The device 600 corresponds to the device of FIG. 5.

The detection module 10 comprises an array infrared detector, composed by infrared detectors 11 sensitive in the infrared and more particularly over the use wavelength range. For example, it consists of an array of semiconductor photodiodes or an array of bolometers. Here, the array infrared detector extends according to a square or rectangular surface, with a side preferably comprised between 1 mm and 10 mm. Here, it extends in a plane (xOy). The detection module 10 may further comprise an electronic circuit, which is not represented, for reading electrical signals output by the array infrared detector. The array infrared detector extends opposite the through opening 615 formed in the low-index layer 650. In an orthogonal projection of the system 6000 in a plane (xOy), the array infrared detector therefore extends inside a region delimited by said through opening 615.

In use, light is distributed on the scene to be illuminated S by the device 600. The scene to be illuminated sends back part of the received light, by backscattering. The backscattered light crosses the device 600 at the through openings 681 and 615, throughout a region surrounded by the circle-arc portion of the linear waveguide 610, then reaches the detection module 10. At this detection module 10, the array infrared detector acquires an image of the light backscattered by the scene to be illuminated.

Here, the device 600 and the detection module 10 are in direct physical contact with one another. Alternatively, they may be separated by a low-index interlayer that is transparent to the wavelengths to be detected, in particular an air layer.

Figure 7:
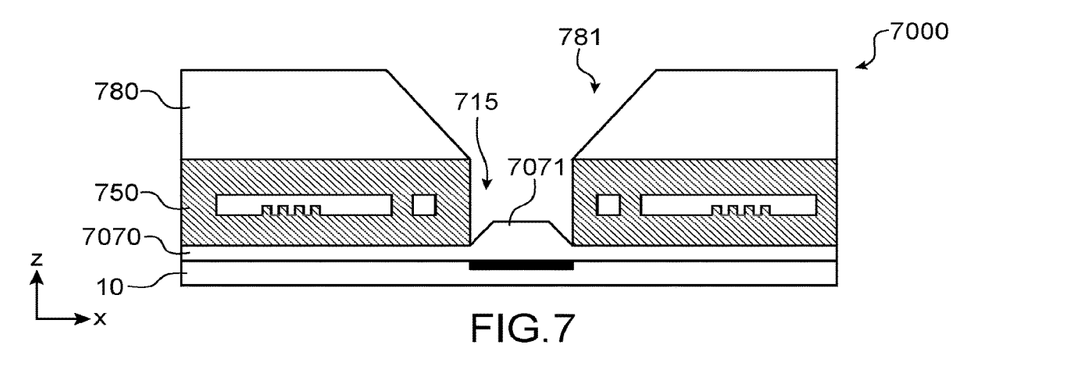
FIG. 7 schematically illustrates, according to a sectional view, an infrared imaging system according to a second embodiment of the invention.

FIG. 7 schematically illustrates, according to a sectional view, an infrared imaging system 7000 according to a second embodiment of the invention. The system 7000 of FIG. 7 differs from that FIGS. 6A and 6B in that it further includes an interlayer substrate 7070, disposed here between the low-index layer 750 and the detection module 10. Here, the interlayer substrate 7070 is located in direct physical contact with the low-index layer 750, on the side opposite to the support substrate 780. Here, yet without limitation, the interlayer substrate 7070 is further located in direct physical contact with the detection module 10. The interlayer substrate 7070 is transparent over the use wavelength range. It is provided with a pedestal 7071 projecting into the through opening 715 in the low-index layer, in the direction of the through opening 781 in the support substrate (in the direction opposite to the detection module 10).

The pedestal 7071 includes lateral faces inclined obliquely with respect to the plane (xOy), preferably by an angle of 54.74° with respect to the plane (xOy). For example, the height of the pedestal 7071 according to the axis (Oz) is comprised between 150 μm and 250 μm. The pedestal 7071 allows diverting parasitic light rays that would otherwise propagate directly from the output of the support substrate up to the array infrared detector. Preferably, the interlayer substrate 7070 is made of silicon, like the support substrate 780.

In a non-represented variant, the interlayer substrate rather extends between the low-index layer 750 and the support substrate 780. In this case, the pedestal projects into the opening 781 in the support substrate 780.

According to still other variants, the thickness of the interlayer substrate is zero, except at the level of the pedestals.

Figure 8:
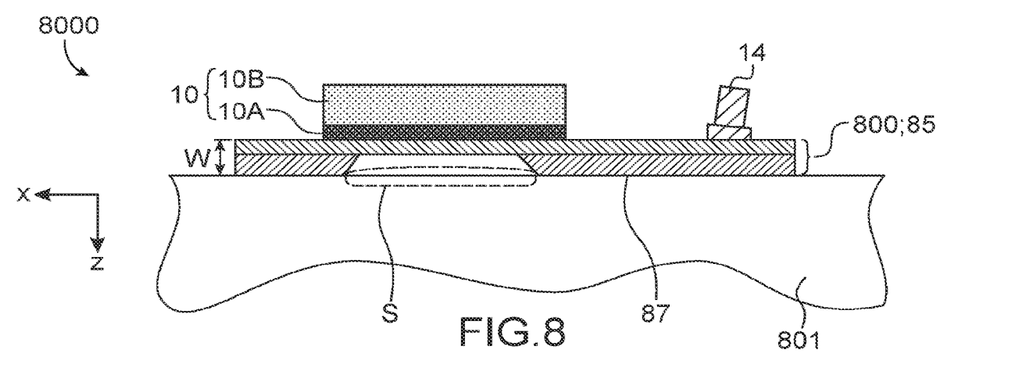
FIG. 8 schematically illustrates an infrared imaging system according to the invention, when in use.

FIG. 8 schematically illustrates an infrared imaging system 8000 according to the invention, when in use. The infrared imaging system 8000 includes a device 800 such as that of FIG. 5, receiving light from an infrared light source 14. Light is distributed on a scene to be illuminated S belonging, here, to a sample 801. In FIG. 8, the array infrared detector 10A and the reading circuit 10B, together forming the detection module 10, are explicitly represented.

Here, the infrared imaging system 8000 includes a spacing element 85, or spacer, mounted secured to the detection module 10 on the array infrared detector 10A side. The spacing element 85 includes a bearing surface 87, on the side opposite to the detection module 10. Here, the bearing surface 87 extends in a plane parallel to the plane (xOy), parallel to the plane of the array infrared detector 10A. The spacing element 85 has a thickness W, measured according to the axis (Oz). In operation, the bearing surface 87 bears against the sample 801. A region of the sample 801 located opposite the array infrared detector 10A forms the scene to be illuminated S. The spacing element 85 guarantees a predetermined fixed distance between the scene to be illuminated and the array infrared detector 10A, called work distance. Preferably, the work distance is comprised between 100 μm and 1.5 mm. Here, the infrared light source 14 lies on the spacing element 85, on the side opposite to the bearing surface 87. Here, the demultiplexing device 800 is coincident with the spacing element 85.

In non-represented variants, the device 800 forms only part of the spacing element 85. For example, the spacing element 85 may be formed by the superimposition of the device 800 and of an additional wedge. In any case, the small thickness of the device according to the invention enables it to form all or part of the spacing element 85.

The detection module 10 and the demultiplexing device 800 together form a lens-less imaging system, adapted to acquire an image of the scene to be illuminated, without image forming optics (possibly except an array of microlenses upstream of the array infrared detector 10A. The obtained images are wide-field images, in reflection.

Figure 9:
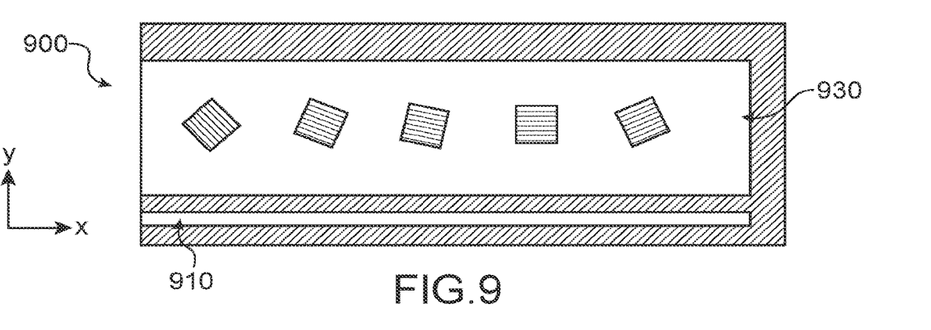
FIG. 9 schematically illustrates, according to a top view in transparency, a device according to a fourth embodiment of the invention.

The invention is not limited to the examples detailed hereinbefore. For example, the extraction assembly may be located in the core layer of the planar waveguide. Alternatively, the extraction assembly may be located in an optical cladding layer of the planar waveguide, preferably on the side opposite to the support substrate. Preferably, the diffraction gratings then consist of portions made of the material of the low-index layer and hollow portions adapted to be filled with air. The invention is neither limited to one-dimensional diffraction gratings, and also covers devices wherein the extraction assembly comprises or consists of two-dimensional diffraction grating(s). Preferably, a two-dimensional diffraction grating is in the form of an array of pads, with a plurality of pads according to each dimension of the diffraction grating. Similarly, the invention is not limited to the mentioned examples of materials, and may in particular be adapted to other wavelength ranges, in the infrared or in the visible. A distance between the linear waveguide and the planar waveguide may be constant. The planar waveguide may have its large faces with any shape, for example square or rectangular shaped (outside the indentation). Advantageously, the bottom of the indentation in the planar waveguide has a curved shape, but not necessarily rounded like a circle arc. Finally, the different examples of the device and the system may be combined together. According to still other variants, the planar waveguide is devoid of any indentation, and the linear waveguide extends against an outer edge of the planar waveguide. Such a variant 900 is illustrated in FIG. 9, where the linear waveguide 910 extends as a straight line along a straight edge of the planar waveguide 930. The assembly may be covered with a support substrate similar to that of the embodiment of FIG. 1B.

The device according to the invention may be made from a crystalline silicon substrate, which could be thinned. The planar waveguide and the linear waveguide are made by epitaxy of a first low-index layer, epitaxy and etching of a high-index layer, and then epitaxy of a second low-index layer. The assembly is polished on the side opposite to the silicon substrate. Where appropriate, diffraction gratings are etched in the high-index layer, by anisotropic partial etching, before the epitaxy of the second low-index layer. The obtained assembly may be turned over and partially etched in an anisotropic manner at the rear face, to form a through opening in the silicon substrate and in the low-index layers.

The device and the system according to the invention find advantageous applications in the active multispectral imaging and active hyperspectral imaging fields, to easily and rapidly obtain biochemical information.

The invention claimed is:

1. A wavelength demultiplexing device configured to spatially distribute the spectral contributions of an incident light beam when in use, wherein:
   a linear waveguide, adapted to perform an optical guidance along a guide line and over a use wavelength range; and
   a planar waveguide, adapted to perform an optical guidance in a guide plane and over said use wavelength range;
   with the linear waveguide and the planar waveguide formed in a coplanar way, and configured so as to be optically coupled with one another by evanescent coupling along a coupling line, when in use,
   a distance between the linear waveguide and the planar waveguide varying decreasingly, along the coupling line and in the direction of propagation of light in the linear waveguide, when in use.

2. The device according to claim 1, wherein the planar waveguide comprises a core layer an edge of which opposite the coupling line is bent upon itself so as to form an indentation, and wherein the linear waveguide is bent upon itself, and located inside the indentation formed in the planar waveguide.

3. The device according to claim 1, further comprising:
   an extraction assembly, located in the planar waveguide, and consisting of a plurality of diffraction grating each configured to extract light out of the planar waveguide;
   with each of the diffraction gratings of the extraction assembly configured so as to extract light at a different wavelength called extraction wavelength.

4. The device according to claim 3, wherein the diffraction gratings of the extraction assembly are positioned so that, in an orthogonal projection of the diffraction gratings on the coupling line, these are arranged in the descending order of their extraction wavelength, along the coupling line and in the direction of propagation of light in the linear waveguide when in use.

5. The device according to claim 3, wherein, in an orthogonal projection of the diffraction gratings on the coupling line, these are arranged in the ascending order of their extraction rate, along the coupling line and in the direction of propagation of light in the linear waveguide when in use.

6. The device according to claim 3, wherein, in each of the diffraction gratings of the extraction assembly, the patterns of the diffraction grating are disposed along lines which are orthogonal to a direction of propagation of light in the planar waveguide at said diffraction grating.

7. The device according to claim 3, wherein the planar waveguide includes a core layer interposed between two optical cladding layers, and wherein the diffraction gratings extend in one of the optical cladding layers, or in a superficial region of the core layer at an interface between the core layer and one amongst the two optical cladding layers.

8. The device according to claim 3, wherein:
   the planar waveguide comprises a core layer an edge of which opposite the coupling line is bent upon itself so as to form an indentation, the linear waveguide is bent upon itself, and located inside the indentation formed in the planar waveguide; and the device further includes a support substrate, transparent over the use wavelength range, superimposed with the planar waveguide along an axis orthogonal to the plane of the planar waveguide, with the support substrate which is provided with a through opening located opposite a portion of at least one indentation formed in the planar waveguide.

9. The device according to claim 8, wherein the through opening is delimited by at least one transverse face, which extends from one face to the opposite face of the support substrate, and wherein said transverse face includes a curved surface or a series of facets inclined obliquely with respect to the plane of the planar waveguide.

10. The device according to claim 9, wherein each of the diffraction gratings is configured so as to extract light at its extraction wavelength, according to a respective extraction axis directed obliquely with respect to the plane of the planar waveguide, with the extraction axis directed so that light reaches said transverse face at a normal incidence.

11. The device according to claim 8, comprising a pedestal, transparent over the use wavelength range, and located opposite the through opening formed in the support substrate.

12. An infrared imaging system comprising:
a wavelength demultiplexing device according to claim 8, configured so as to distribute on a scene to be illuminated light rays originating from an appended light source, when in use; and
an imaging module, including an array infrared detector configured so as to receive light rays sent back by the scene to be illuminated;
with the array infrared detector located opposite at least one portion of the indentation formed in the planar waveguide, on the side of the planar waveguide opposite to the support substrate.

13. The system according to claim 12, further comprising an infrared light source forming the appended light source, and wherein the wavelength demultiplexing device is configured so as to receive at input light rays originating from said infrared light source and distribute these rays on the scene to be illuminated, when in use.

14. The system according to claim 12, comprising a spacing element, mounted secured to the imaging module, and provided with a bearing surface intended to come into contact with a sample to be analysed and located on one side of the spacing element opposite to the imaging module, and wherein the wavelength demultiplexing device forms all or part of the spacing element.

* * * * *